United States Patent [19]
Okashita et al.

[11] Patent Number: 5,979,918
[45] Date of Patent: *Nov. 9, 1999

[54] STEERING APPARATUS FOR AUTOMOTIVE VEHICLE

[75] Inventors: Ryuichi Okashita; Naoyasu Sugimoto, both of Toyota, Japan

[73] Assignee: Toyota Jidosha Kabushiki Kaisha, Toyota, Japan

[*] Notice: Under 35 U.S.C. 154(b), the term of this patent shall be extended for 464 days.

[21] Appl. No.: 08/926,986

[22] Filed: Sep. 10, 1997

Related U.S. Application Data

[63] Continuation of application No. 08/669,825, Jun. 26, 1996, abandoned, which is a continuation of application No. 08/360,060, Dec. 20, 1994, abandoned.

[30] Foreign Application Priority Data

Dec. 22, 1993 [JP] Japan .................................. 5-324021

[51] Int. Cl.$^6$ ...................................................... B62D 3/12
[52] U.S. Cl. ...................................... 280/93.515; 180/428
[58] Field of Search .......................... 74/29; 280/93.514, 280/93.515

[56] References Cited

U.S. PATENT DOCUMENTS

| | | | |
|---|---|---|---|
| 3,691,905 | 9/1972 | Baxter | 180/DIG. 13 X |
| 3,980,315 | 9/1976 | Hefren | 280/94 |
| 4,213,626 | 7/1980 | Moore | 280/94 |
| 4,758,012 | 7/1988 | Ogura et al. | 180/143 X |
| 4,953,889 | 9/1990 | Reilly | 280/661 |

FOREIGN PATENT DOCUMENTS

| | | | |
|---|---|---|---|
| 0 053 666 | 6/1982 | European Pat. Off. . | |
| 58-110372 | 6/1983 | Japan | 280/94 |
| U-60-131464 | 9/1985 | Japan . | |
| U-1-144170 | 10/1989 | Japan . | |
| 81/03472 | 12/1981 | WIPO . | |

*Primary Examiner*—Kevin Hurley
*Assistant Examiner*—Gary Savitt
*Attorney, Agent, or Firm*—Oliff & Berridge, PLC

[57] ABSTRACT

A steering apparatus for an automotive vehicle having a steering mechanism arranged to steer a set of dirigible road wheels in accordance with a steering effort applied to a steering wheel, wherein the steering mechanism is designed to preliminarily bias the road wheels leftward or rightward in a condition where the steering wheel is placed in a neutral position for straight travel of the vehicle.

3 Claims, 3 Drawing Sheets

STEERING APPARATUS FOR AUTOMOTIVE VEHICLE

This is a continuation of application Ser. No. 08/669,825 filed Jun. 26, 1996, now abandoned, which in turn is a continuation of Ser. No. 08/260,060 filed Dec. 20, 1994, now abandoned.

BACKGROUND OF THE INVENTION

1. Field of the Invention

The present invention relates to a steering apparatus for automotive vehicles, and more particularly to an improvement of the steering apparatus for enhancing a straight running characteristic of the vehicle.

2. Description of the Prior Art

Disclosed In Japanese Utility Model Laid-open Publication Hei No. 1-144170 is a steering apparatus of the rack-and-pinion type for an automotive vehicle which includes a tubular housing mounted on the vehicle body to support a rack member displaceable in a lateral direction, a pair of tie rods each connected to the opposite ends of the rack member to steer a set of road wheels in accordance with lateral displacement of the rack member, and a pair of dust boots each coupled at their one ends with the opposite ends of the tubular housing and at their other ends with the tie rods to encompass each joint portion of the tie rods with the rack member.

In such a conventional steering apparatus as described above, the steering characteristic is symmetrical in left and right directions to maintain the steering wheel in a neutral position even if the driver causes tie vehicle to travel on a flat road without holding the steering wheel. In general, the surface of the flat road is, however, raised at a central portion of the road for drainage. Accordingly, if the driver causes the vehicle to travel on the flat road without holding the steering wheel placed in the neutral position, the steering wheel will be displaced leftward or rightward from the neutral position in accordance with lateral inclination of the road surface. As a result, straight travel of the vehicle may not be maintained. In the case that the road wheels of the vehicle are equipped with radial tires for traveling on a left or right lane of the travel road, a ply-steer residual cornering force caused by the tires themselves acts to restrain the lateral displacement of the vehicle. If the ply-steer residual cornering force is excessive, the vehicle tends to travel in an opposite direction against the lateral inclination of the road surface.

SUMMARY OF THE INVENTION

It is, therefore, a primary object of the present invention to provide an improved steering apparatus for an automotive vehicle capable of enhancing a straight running characteristic of the vehicle in a condition where the steering wheel is placed in a position corresponding to straight ahead travel.

According to the present invention, the object is accomplished by providing a steering apparatus for an automotive vehicle having a steering mechanism arranged to steer a set of road wheels in accordance with a steering effort directly applied to a steering wheel of the vehicle, wherein the steering mechanism comprises biasing means for preliminarily biasing the road wheels in a predetermined lateral direction in a condition where the steering wheel is placed in a position corresponding to straight travel of the vehicle.

In a steering apparatus the steering mechanism of which includes a tubular housing mounted on a body structure of the vehicle to support a rack member displaceable in a lateral direction, a pair of tie rods each connected to opposite ends of the rack member to steer the road wheels in accordance with lateral displacement of the rack member and a pair of dust boots fixedly coupled at their one ends with the tie rods and at their other ends with opposite ends of the housing, the dust boots are adapted as the biasing means for preliminarily biasing the road wheels in the predetermined lateral direction in a condition where the steering wheel is placed in the position corresponding to straight travel of the vehicle.

BRIEF DESCRIPTION OF THE DRAWINGS

Other objects, features and advantages of the present invention will be more readily appreciated from the following detailed description of a preferred embodiment thereof when taken together with the accompanying drawings, in which.

DETAILED DESCRIPTION OF THE PREFERRED EMBODIMENTS

Figure 1:
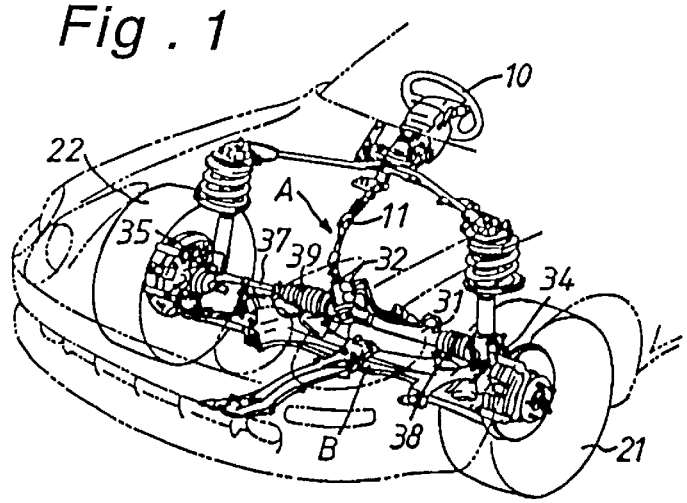
FIG. 1 is a perspective view of a steering apparatus mounted on an automotive vehicle which is equipped with a right-hand steering wheel.

In FIG. 1 of the drawings, there is illustrated a steering apparatus of the rack-and-pinion type mounted on an automotive vehicle which is equipped with a right-hand steering wheel 10 to travel on a left-hand lane of the travel road. In the steering apparatus, a steering effort is directly applied to the steering wheel 10 and transmitted to a set of dirigible road wheels 21, 22 through a steering mechanism A to steer the road wheels. The road wheels 21, 22 each are equipped with a radial tire for traveling on the left-hand lane. The radial tire is designed to cause a ply-steer residual cornering force acting on the vehicle body rightward.

Figure 2:
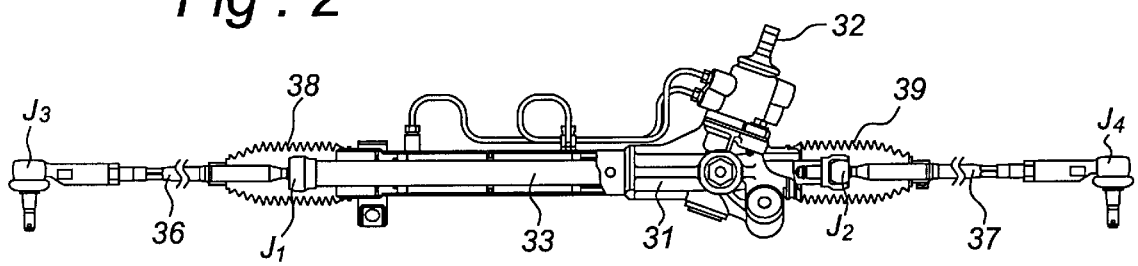
FIG. 2 is a partly broken rear view of the steering apparatus shown in FIG. 1.

As shown in FIGS. 1 and 2, the steering mechanism A comprises a tubular housing 31 mounted on a vehicle body structure B and extending laterally in the rearward of each axle of the road wheels 21, 22, a pinion shaft 32 operatively connected to the steering wheel 10 through a steering shaft assembly 11, a rack member 33 supported by the housing 31 to be laterally displaced in accordance with rotation of the pinion shaft 32, a pair of tie rods 36, 37 each connected at their one ends to the opposite ends of rack member 33 by means of ball joints J1, J2 and at their other ends to a pair of knuckle arms 34, 35 by means of ball Joints J3, J4 to steer the road wheels 21, 22 in accordance with lateral displacement of the rack member 33, and a pair of elastic dust boots 38, 39 coupled at their one ends with the tie rods 36, 37 and at their other ends with the opposite ends of the tubular housing 31 to encompass each Joint portion of the tie rods 36, 37 with the rack member 33.

Figure 3:
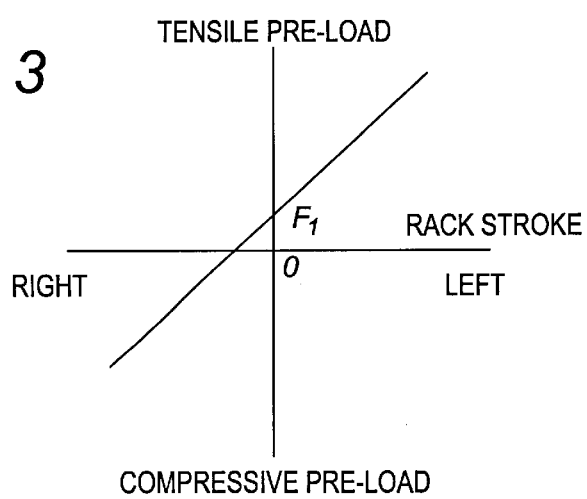
FIG. 3 is a graph showing a characteristic of a left-hand dust boot shown in FIG. 2.
Figure 4:
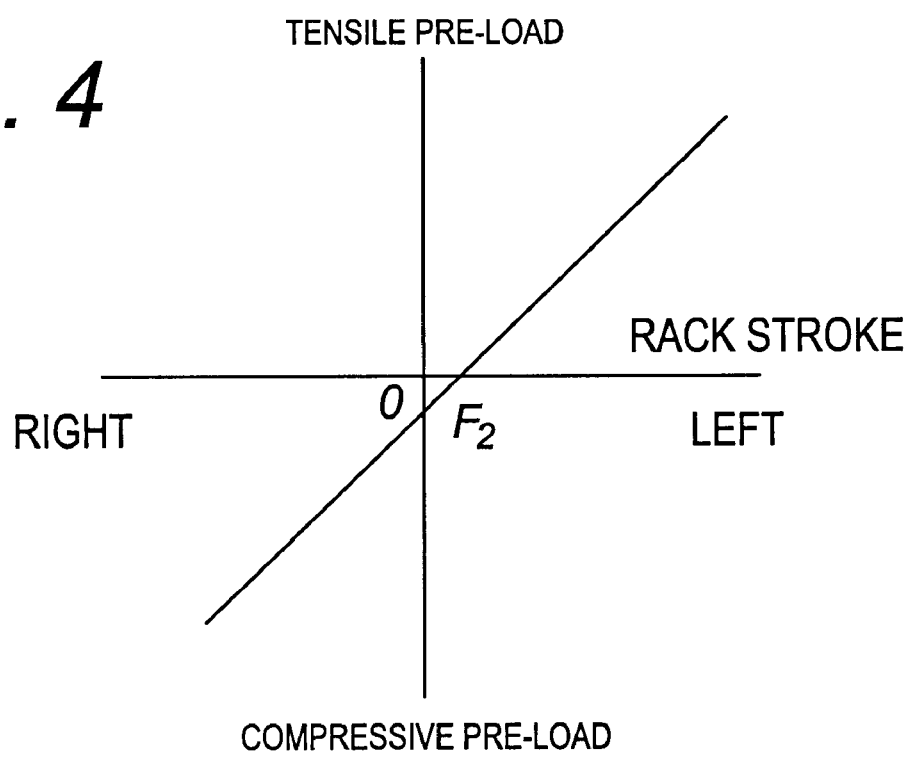
FIG. 4 is a graph showing a characteristic of a right-hand dust boot shown in FIG. 2.

The left-hand dust boot 38 is coupled with the tie rod and tubular housing 31 in a condition where the steering wheel is retained in a position corresponding to straight ahead travel. In this instance, the left-hand dust boot 38 is stretched in a predetermined amount and fixed in place to be applied with a predetermined tensile pre-load $F_1$ as shown in FIG. 3. Similarly, the right-hand dust boot 39 is coupled with the tie rod 37 and tubular housing 31 in a condition where the steering wheel 10 is retained in the position corresponding to straight ahead travel. In this instance, the right-hand dust boot 39 is compressed in a predetermined amount and fixed in place to be applied with a predetermined compressive pre-load $F_2$ as shown in FIG. 4. With such an arrangement of the dust boots 38, 39, the rack member 33 is biased rightwards under the pre-load $(F_1+F_2)$ of dust boots 38, 39 in a condition where the steering wheel 10 is retained in the position corresponding to straight ahead travel. In this embodiment, the pre-load $(F_1+F_2)$ of dust boots 38, 39 is determined taking into account of lateral inclination of the road surface and the ply-steer residual cornering force of the radial tires.

Assuming that the driver causes the vehicle to travel without holding the steering wheel 10 placed in the position corresponding to straight ahead travel, the rack member 33 is biased rightward under the pre-load $(F_1+F_2)$ of dust boots 38, 39 to steer the road wheels 21, 22 leftward thereby to restrain rightward lateral displacement of the vehicle caused by the ply-steer residual cornering force or side force applied from the radial tires for travel on the left-hand lane. This is effective to enhance the straight running characteristic of the vehicle. In case the ply-steer residual cornering force or side force caused by rotation of the radial tires is small, the vehicle tends to displace leftward due to the lateral inclination of the road surface. In such a case, the mounting condition of the dust boots 38, 39 is reversed so that the pre-load of dust boots 38, 39 acts to bias the rack member 33 leftward. With this arrangement, the left-ward lateral displacement of the vehicle is restrained to enhance the straight running characteristic of the vehicle.

Figure 5:
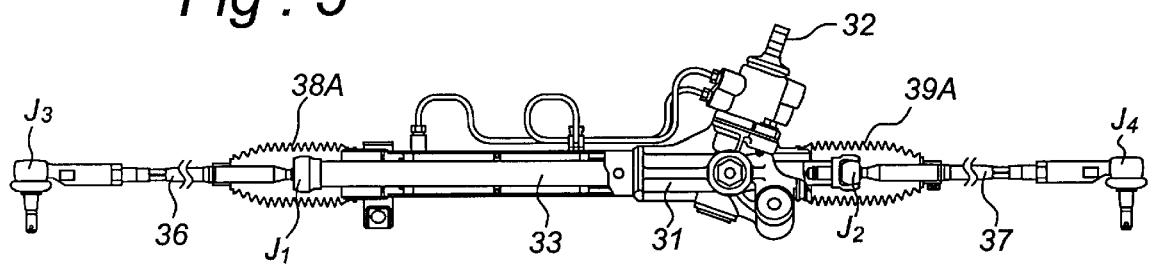
FIG. 5 illustrates the steering apparatus of FIG. 2 with one dust boot stretched and the other dust boot compressed.

As shown in FIG. 5, the left-hand dust boot 38A may be compressed by a predetermined amount and fixed in place by taking into account the predetermined compressive pre-load force and the right-hand dust boot 39A may be stretched by a predetermined amount and fixed in place by taking into account the predetermined tensile pre-load force. This condition will bias the rack member 33 leftward under the pre-load of the dust boots to restrain leftward lateral displacement of the vehicle for travel on the right-hand lane. Alternatively, as noted above, the compressive condition of the dust boots 38, 39 may be reversed to bias the rack member 33 rightward for travel on the left-hand lane.

Although in the above embodiment, the dust boots 38, 39 of the steering mechanism A have been mounted to preliminarily bias the road wheels 21, 22 in a predetermined direction in a condition where the steering wheel 10 is placed in the neutral position, coil springs may be mounted within the dust boots 38, 39 to effect the same function as the dust boots in the above embodiment. Alternatively, an appropriate spring may be assembled within the steering mechanism to preliminarily apply a rotation torque to the steering shaft 11. Although in the above embodiment, the present invention has been adapted to a steering apparatus of an automotive vehicle equipped with a right-hand steering wheel for travel on a left-hand lane of the travel road, the present invention may be adapted to a steering apparatus of an automotive vehicle equipped with a left-hand steering wheel for travel on a right-hand lane of the travel road. It is also noted that the present invention may be adapted to a steering apparatus of the other type such as the ball-screw type.

What is claimed is:

1. A steering apparatus for an automotive vehicle comprising:

a steering mechanism for steering a set of road wheels on a road surface, the steering mechanism including a tubular housing adapted to be mounted mounted on a body structure of the vehicle to support a rack member displaceable in a lateral direction, and first and second tie rods, said first tie rod connected to one end of the rack member, said second tie rod connected to the opposite end of the rack member; and first and second elastic dust boots applying a pre-load force to the set of road wheels which is predetermined by taking into account a lateral inclination of the road surface and a ply-steer residual cornering force of tires on the road surface so as to bias the set of road wheels in a predetermined lateral direction when the steering wheel is retained in a neutral position, said first dust boot coupled at one end to said first tie rod and at the other end to said tubular housing, said second dust boot coupled on one end to said second tie rod and on the other end to said tubular housing.

2. A steering apparatus as claimed in claim 1, wherein said first and second dust boots are mounted in a compressed form with compressive pre-load forces different to one another such that the steering wheel is retained in a position corresponding to straight ahead travel.

3. A steering apparatus as claimed in claim 1, wherein said first dust boot is stretched by a first selected amount and fixed in place, said first selected amount corresponding to the pre-load force; and said second dust boot is compressed by a second selected amount and fixed in place, said second selected amount corresponding to the pre-load force.

\* \* \* \* \*